March 29, 1938.  F. E. SCHWENTLER  2,112,817
AUTOMATIC SLACK ADJUSTER
Filed Nov. 17, 1936
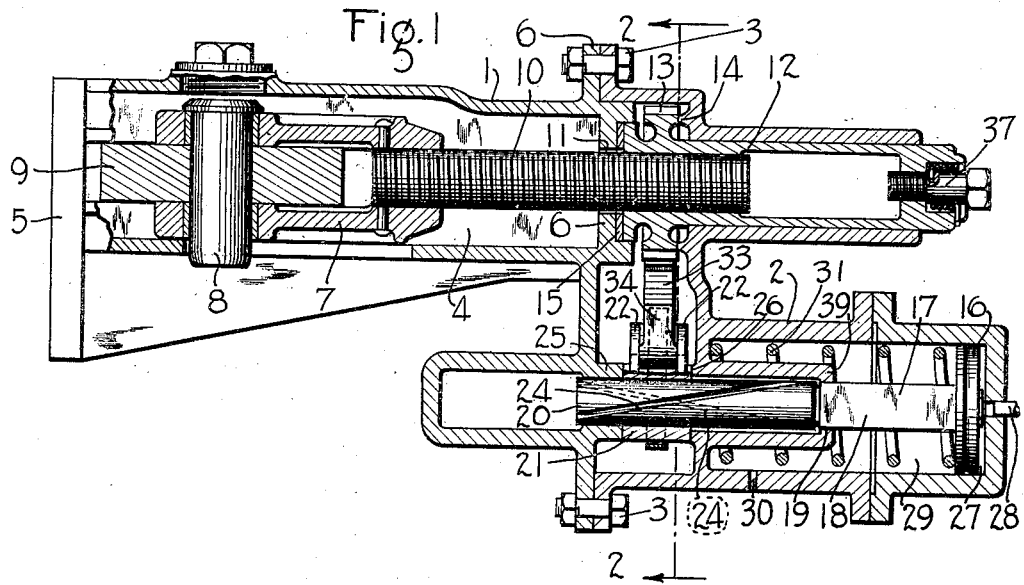
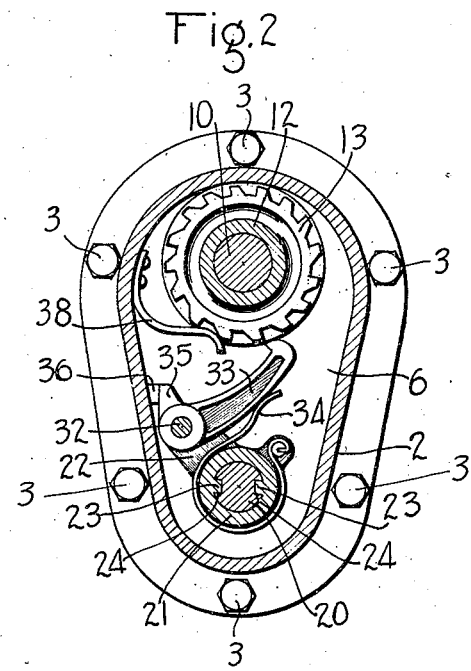
INVENTOR
FRANCIS E. SCHWENTLER
BY
ATTORNEY Patented Mar. 29, 1938

2,112,817

UNITED STATES PATENT OFFICE 2,112,817

AUTOMATIC SLACK ADJUSTER

Francis E. Schwentler, St. Louis, Mo., assignor to The American Brake Company, Wilmerding, Pa., a corporation of Missouri Application November 17, 1936, Serial No. 111,222

20 Claims. (Cl. 188—203)

This invention relates to automatic slack adjusters for railway brakes and more particularly to that type of slack adjuster disclosed in the pending application of William Girscht, Serial No. 15,745, filed April 11, 1935, in which the longitudinal axes of the slack take-up mechanism and the motor for actuating said mechanism are spaced apart and extend parallel with each other.

The principal object of the present invention is to provide an automatic slack adjuster of the above mentioned type having an improved and simplified driving means from the actuating motor to the slack take-up mechanism and also having an improved and simplified actuating motor.

In the accompanying drawing, Fig. 1 is a vertical longitudinal sectional view of an automatic slack adjuster embodying the invention; and Fig. 2 is a cross-sectional view of the same taken on the line 2—2 of Fig. 1.

As shown in the drawing, the slack adjuster may comprise casing sections I and 2 which are secured together by means of bolts 3 or the like.

The casing section I comprises a horizontally disposed hollow portion 4 which at one end is provided with laterally extending flanges 5 (only one being shown) which are adapted to be secured to the usual brake cylinder (not shown) of a fluid pressure brake equipment, and having at the other end a vertically disposed end wall 6 to which the casing section 2 is secured.

Slidably mounted in the portion 4 of the casing section I to move back or forth longitudinally thereof is a non-rotatable cross-head 7 which is operatively connected by means of a pin 8 to a horizontally disposed brake element to be adjusted which element, as shown, may be a dead brake lever 9.

Secured to the cross-head is a non-rotatable slack take-up screw 10 which extends longitudinally of the portion through an opening 11 provided in the end wall 6 of the casing section I and which at its outer end has screw-threaded connection with a rotatable adjusting nut 12 journalled in the casing section 2 and wall 6 of the casing section I in axial alignment with the screw 10.

The adjusting nut 12, adjacent its inner end, is provided with a ratchet wheel 13 which is slidably engaged by an annular boss 14 of the casing section 2, such engagement preventing undue longitudinal movement of the nut in the direction toward the right hand, undue movement of the nut in the opposite direction being prevented by the engagement of the inner end of the nut with an annular bearing plate 15 carried by and abutting the end wall 6 of the casing section I.

The outer end of the adjusting nut 12 projects beyond that portion of the casing section 2 in which the nut is journalled so as to provide for the engagement of the nut by a wrench or other suitable tool for manually rotating the nut when it is desired to reset the adjuster as is necessary when worn brake shoes are replaced by new ones.

Arranged below the take-up screw 10 and adjusting nut 12 and slidably mounted in the casing section 2 to move back and forth in directions parallel to the longitudinal axis of the adjusting nut 12 is a piston 16 having a piston rod 17 which is slidably mounted in the casing sections I and 2. The piston 16 and rod 17 are integrally or otherwise connected together so that rotary movement of one relative to the other will not be permitted.

The piston rod 17 for a portion of its length, as indicated by the reference character 18, is preferably made square in cross section and is slidably guided by the casing section 2 within a correspondingly shaped opening 19 provided by a piston stop 39 of said casing section, the clearance space between the rod and the defining sides of the opening being insufficient to permit undue rocking movement of the rod relative to the casing section. The remaining portion 20 of the piston rod is made round in cross-section and at its end is slidably guided by the casing section I within a recess provided for the reception of this portion of the rod.

Interposed between the casing sections I and 2 and rockably mounted on the portion 20 of the piston rod is a member 21 having a pair of spaced arms 22, the direction of movement of the member being at right angles to that of the piston rod. The member 21 is provided with male spiral threads or teeth 23 which interengage with female spiral threads 24 which are provided in the portion 20 of the piston rod. By reason of such interengagement between the spiral threads 23 and 24, longitudinal movement of the piston rod will cause the member 21 to rock on the portion 20, the member being held against longitudinal movement with the rod by bosses 25 and 26 which are provided on the casing sections I and 2 respectively and which are adapted to be slidably engaged by opposite sides of a portion of the member as shown in Fig. 1.

At one side of the piston 16 there is a chamber 27 which is connected to a pipe 28 leading to the interior of the brake cylinder in the usual manner. While the connection to the brake cylinder is not shown it will be understood that it will be the same as shown in the aforementioned pending Girscht application, Serial No. 15,745, in which, with the brakes released the pipe 28 is connected to the non-pressure side of the brake cylinder piston and consequently to the atmosphere and in which when effecting an application of the brakes the piston travel is excessive, due to wear of the shoes or connected brake elements, the pipe 28 is connected to the pressure side of the brake cylinder piston. At the other side of the piston 16 there is a chamber 29 which is connected to the atmosphere through a passage 30 in the casing section 2 or any other suitable atmospheric communication. Contained in the chamber 29 and interposed between and operatively engaging the casing section 2 and the back of the piston 16 is a spring 31 which at all times tends to urge the piston to its normal position as shown in Fig. 1.

Disposed between and pivotally connected to the outer ends of the arms 22 by means of a pin 32 is a pawl 33 which, as will hereinafter more fully appear, is adapted to be moved into operative engagement with the teeth of the ratchet wheel 13 of the adjusting nut 12 by means of a leaf spring 34 carried by the arm 21. The pawl 33 is provided with a release lug 35 which is adapted to cooperate with a lug 36 on the casing section 2 to normally maintain the pawl out of engagement with the teeth of the ratchet wheel 13 against the opposing action of the leaf spring 34.

Unwanted rotation of the adjusting nut 12 is prevented by the action of a leaf spring 38 which is secured to the casing section 2 and which frictionally engages the ratchet wheel as shown in Fig. 1.

In operation, if in effecting an application of the brakes the brake cylinder piston of the fluid pressure brake equipment moves far enough to uncover the passage 28 to the pressure side of the brake cylinder piston, fluid under pressure from the brake cylinder piston chamber will flow through pipe 28 to the piston chamber 27 of the slack adjuster. Fluid under pressure thus admitted to the chamber 27 causes the piston 16 and thereby the piston rod 17 to move inwardly compressing the spring 31. As the piston rod is thus moved, the interengaging spiral threads 23 and 24 of the piston rod 17 and member 21 cooperate to rock the member 21 in a clockwise direction until the back of the piston is engaged by the stop 39. When the piston has thus been stopped, the arms 22 will have been moved about 75° from their normal position.

Upon initiating the movement of the arms 22 and consequently the pivotal connection between the arms and pawl 33, the leaf spring 34 acts to rock the pawl 33 relative to the arms in a counter-clockwise direction into the path of travel of the teeth of the ratchet wheel 13, and as the movement of the arms continues the pawl ratchets over the backs of the first two teeth and into operative engagement with the face of the second tooth when the arms have reached the limit of their travel.

When in effecting the release of the brakes, the brake cylinder piston, in its movement to release position, again connects the pipe 28 to the non-pressure or atmospheric side of the brake cylinder piston the pressure of fluid in piston chamber 27 is reduced to atmospheric pressure. As the fluid pressure is thus reduced the spring 31, which has been previously compressed, acts to move the piston 16 and thereby the piston rod 17 outwardly to their normal position as shown in Fig. 1. As the stem thus moves, the interengaging spiral threads 23 and 24 of the rod and member 21 respectively, cooperate to rock the member in a counter-clockwise direction causing the pawl, which is in operative engagement with one of the teeth of the ratchet wheel, to rotate the ratchet wheel 13 and thereby the nut 12 in a clockwise direction. As the member 21 nears its limit of travel, the lug 35 of the pawl 33 is engaged by the lug 36 on the casing section 2, so that as the movement of the member is continued the pawl moves out of engagement with the ratchet wheel, the actual separation of the pawl from the ratchet wheel occurring just shortly before the member reaches the position in which it is shown in Fig. 2. The pawl 33 is now maintained in this position until such time as the piston 16 is moved to effect the operation of the several parts of the adjuster to take up slack. With the pawl in this position the nut 12 may be rotated manually without opposition by the pawl in resetting the adjuster.

The rotation of the nut 12 as just described causes the screw-threaded take-up member 10 and thereby the cross-head 7 and connected end of the lever 9 to move a short distance toward the right, thus taking up slack.

The outer end of the adjusting nut 12 is provided with a stop mechanism 37 which is for the purpose of facilitating the resetting of the adjuster when the slack adjusting member engages the mechanism and stops the piston 16 before the piston has completed its adjusting stroke and since this mechanism is substantially the same as that fully disclosed and broadly claimed in Patent No. 1,650,313 of Frederick G. Williamson, issued November 22, 1927, and since this construction is not claimed in the present application, further description of the mechanism is deemed unnecessary.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In an automatic slack adjuster, in combination, a casing, a piston operatively mounted in said casing and having a piston rod movable longitudinally, a ratchet nut for taking up slack, a pawl operative to actuate said nut, a member rockably mounted on said piston rod and adapted to be rocked thereby for actuating said pawl, and means for maintaining said member against longitudinal movement with the piston rod.

2. In an automatic slack adjuster, in combination, a casing, a piston operatively mounted in said casing and having a piston rod, a ratchet nut for taking up slack, a pawl operative to actuate said nut, and a member rockably mounted on said piston rod and having screw-threaded connection with said piston rod for actuating said pawl.

3. In an automatic slack adjuster, in combination, a casing, a piston operatively mounted in said casing and having a piston rod, a spiral thread on said piston rod, a ratchet nut for taking up slack, a pawl operative to actuate said nut, a member carried by said piston rod for operating said pawl and having means engaging said thread, whereby said member is rocked to operate said pawl upon movement of said piston rod.

4. In an automatic slack adjuster, in combination, a casing, a piston operatively mounted in said casing, a ratchet nut for taking up slack, a pawl operative to actuate said nut, a rockable member for actuating said pawl, and a piston rod for said piston constituting a support for said member and having means cooperating with the member for rocking the member about the piston rod upon movement of said piston and rod.

5. In an automatic slack adjuster, in combination, a casing, a piston operatively mounted in said casing, a ratchet nut for taking up slack, a pawl operative to actuate said nut, a rockable member for actuating said pawl, and a piston rod for said piston constituting a support for said member and having a screw-thread cooperating with said member to rock the member relative to the piston rod upon movement of said piston and stem.

6. In an automatic slack adjuster, in combination, a casing, a piston operatively mounted in said casing and having a piston rod, a ratchet nut for taking up slack, a pawl operative to actuate said nut, a member for actuating said pawl rockably mounted on said piston rod and pivotally connected to the pawl, and means on said piston rod engaging said member adapted to rock the member upon movement of said piston and rod.

7. In an automatic slack adjuster, in combination, a casing, a piston operatively mounted in said casing and having a piston rod, a ratchet nut for taking up slack, a pawl operative to actuate said nut, and a member pivotally connected to said pawl rockably on and by said piston rod for actuating the pawl.

8. In an automatic slack adjuster, in combination, a casing, a piston operatively mounted in said casing and having a piston rod, a ratchet nut for taking up slack, a pawl operative to actuate said nut, and a member pivotally connected to said pawl and rockable on said piston rod for actuating the pawl, said piston rod having a helical surface cooperating with said member to cause the member to rock upon longitudinal movement of the rod.

9. In an automatic slack adjuster, in combination, a slack take-up element movable longitudinally to take up slack, a rotatable member for actuating said element, a pawl movable at an angle to the axis of said rotatable member for actuating said rotatable member, a member rockable in a direction laterally of the longitudinal axis of said rotatable member for actuating said pawl, and means operative along a line parallel with the longitudinal axis of said rotatable member for actuating the rockable member.

10. In an automatic slack adjuster, in combination, a slack take-up element movable longitudinally to take up slack, a rotatable member for actuating said element, a pawl movable at an angle to the axis of said rotatable member for actuating said rotatable member, a member rockable in a direction laterally of the longitudinal axis of said rotatable member for actuating said pawl, a non-rotatable member movable along a line parallel with the longitudinal axis of said rotatable member for actuating the rockable member, and means for actuating the non-rotatable member.

11. In an automatic slack adjuster, in combination, a slack take-up element movable longitudinally to take up slack, a rotatable member for actuating said element, a pawl movable at an angle to the axis of said rotatable member for actuating said rotatable member, a member rockable in a direction laterally of the longitudinal axis of said rotatable member for actuating said pawl, a non-rotatable spirally threaded member movable along a line parallel with the longitudinal axis of said rotatable member for actuating the rockable member, and fluid pressure controlled means for actuating said non-rotatable member.

12. In an automatic slack adjuster, in combination, a slack take-up element movable longitudinally to take up slack, a rotatable member for actuating said element, a pawl movable at an angle to the longitudinal axis of said rotatable member for actuating said member, a spirally threaded non-rotatable member spaced from said element and rotatable member operable along a line parallel with the longitudinal axis of the rotatable member, and a member rockably mounted on the spirally threaded member and having means cooperating with the thread on said spirally threaded member whereby said spirally threaded member as it is moved imparts rocking movement to the rockable member to actuate said pawl.

13. In an automatic slack adjuster, in combination, a casing, a longitudinally movable member mounted in said casing, a rotatable slack take-up nut mounted in said casing in spaced relation to said member and arranged so that its longitudinal axis is parallel with the longitudinal axis of said member, a pawl for actuating said nut, an arm rockably carried by said member and pivotally connected to said pawl, and means on said member and cooperating with said arm to actuate said arm and thereby said pawl upon movement of said member.

14. In an automatic slack adjuster, in combination, a casing, a longitudinally movable member mounted in said casing, a rotatable slack take-up nut mounted in said casing in spaced relation to said member and arranged so that its longitudinal axis is parallel with the longitudinal axis of said member, a pawl for actuating said nut arranged between said member and nut, and an arm rockable on and by said member when the member is moved longitudinally for actuating said pawl.

15. In an automatic slack adjuster, in combination, a casing, a longitudinally movable member mounted in said casing, a rotatable slack take-up nut mounted in said casing in spaced relation to said member and arranged so that its longitudinal axis is parallel with the longitudinal axis of said member, a pawl for actuating said nut, an arm rockable on and by said member when said member is moved longitudinally in one direction for actuating said pawl to rotate said nut, and means on said pawl adapted to cooperate with said casing for automatically moving the pawl out of operative relation with said nut at substantially the same time as the arm completes its adjusting stroke.

16. In an automatic slack adjuster, in combination, a casing, a longitudinally movable member mounted in said casing, a rotatable slack take-up nut mounted in said casing in spaced relation to said member and arranged so that its longitudinal axis is parallel with the longitudinal axis of said member, a pawl for actuating said nut, and an arm rockable on and by said member when the member is moved longitudinally in one direction for effecting the operation of said pawl to operatively engage said nut without rotating the nut and rockable by said member when the member is moved longitudinally in the opposite direction for actuating said pawl to rotate said nut to take up slack.

17. In an automatic slack adjuster, in combination, a casing, a longitudinally movable member mounted in said casing, a rotatable slack take-up nut mounted in said casing in spaced relation to said member and arranged so that its longitudinal axis is parallel with the longitudinal axis of said member, a pawl for actuating said nut, an arm rockable on and by said member when the member is moved longitudinally in one direction for effecting the operation of said pawl to operatively engage said nut without rotating the nut and rockable by said member when the member is moved longitudinally in the opposite direction for actuating said pawl to rotate said nut to take up slack, and means on said pawl cooperating with said casing to move the pawl out of operative engagement with said nut at substantially the same time as the arm completes its adjusting stroke.

18. In an automatic slack adjuster, in combination, a casing, a piston operatively mounted in said casing, a ratchet nut for taking up slack, a pawl operative to actuate said nut, a rockable member for actuating said pawl, a piston rod for actuating said member, and means on said pawl adapted to cooperate with said casing to move said pawl out of operative engagement with said nut when in taking up slack said member nears its limit of travel.

19. In an automatic slack adjuster, in combination, a casing, a piston operatively mounted in said casing and having a piston rod adapted to be moved longitudinally, a ratchet nut for taking up slack, a pawl operative to actuate said nut, a member mounted on said piston rod and operatively connected to said pawl, means for rocking said member to actuate said pawl upon longitudinal movement of said piston rod, and means for maintaining said member against longitudinal movement with the piston rod.

20. In an automatic slack adjuster, in combination, a casing, a piston operatively mounted in said casing and having a piston rod, a ratchet nut for taking up slack, a pawl operative to actuate said nut, a member mounted on said piston rod and operatively connected to said pawl, and means comprising cooperating spiral threads on the piston rod and member for rocking said member to actuate said pawl upon movement of said piston rod.

FRANCIS E. SCHWENTLER.